April 27, 1926.
W. A. O'BANNON
SAFETY HOOK
Filed Dec. 12, 1925
1,582,345
2 Sheets-Sheet 1
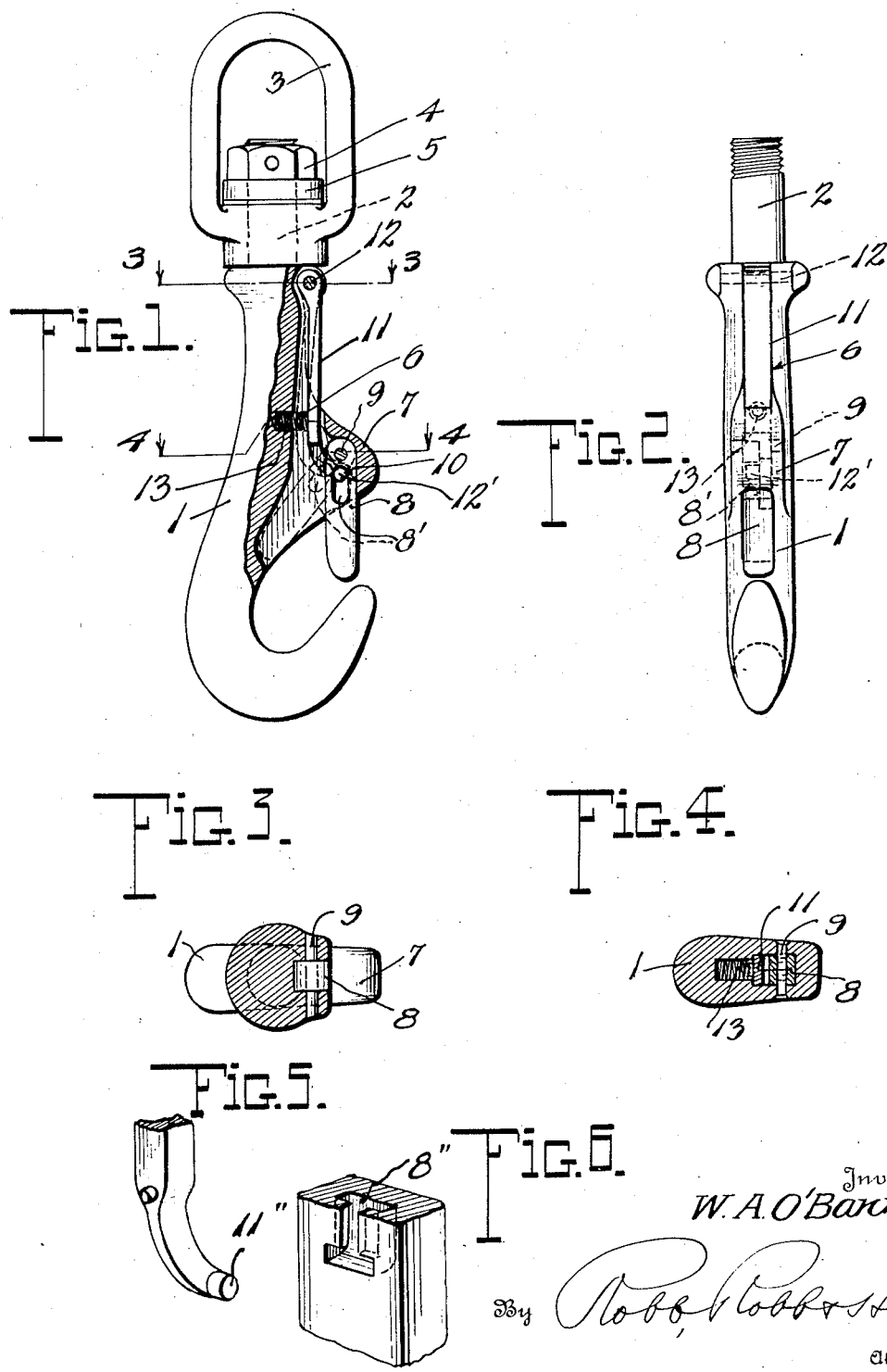

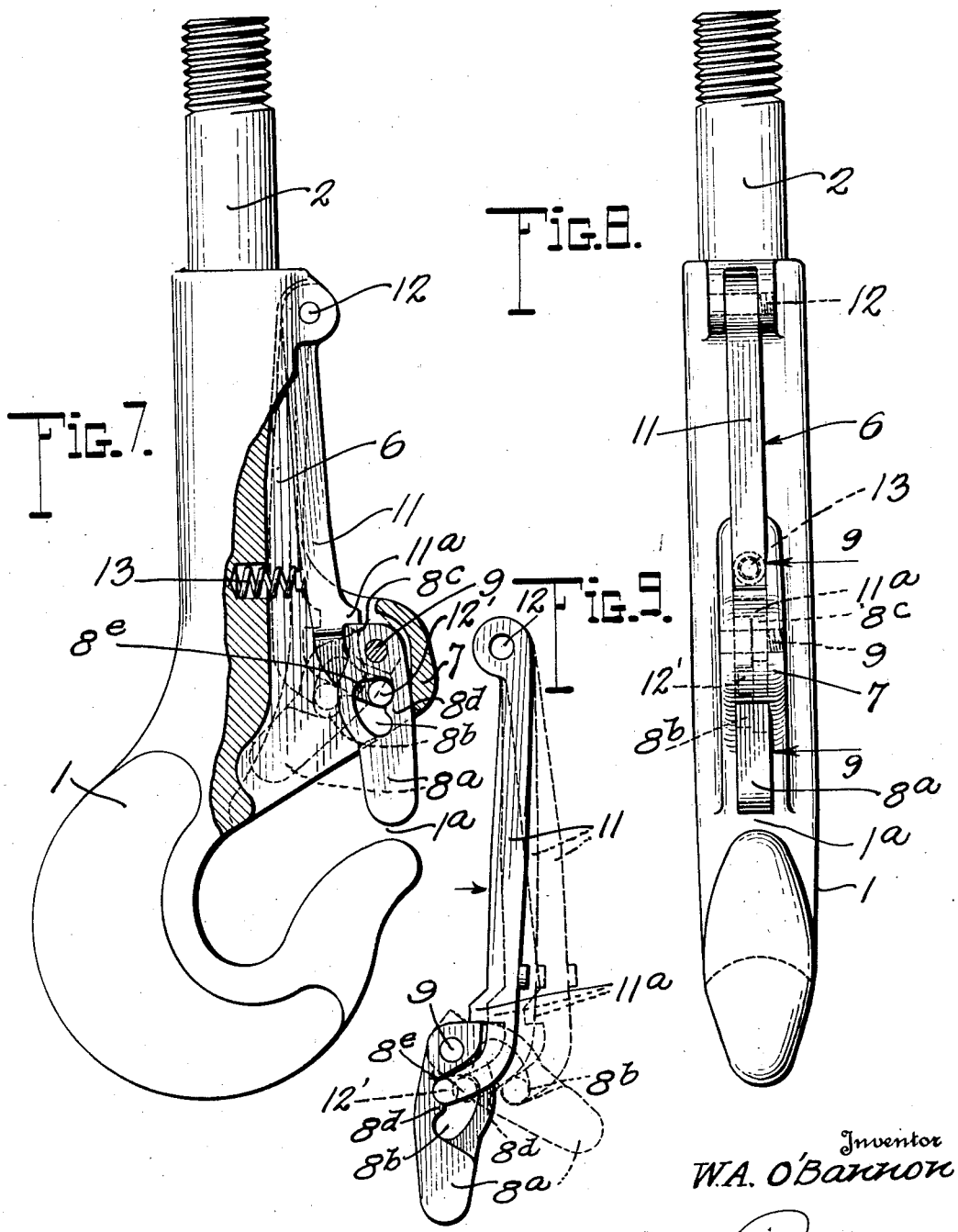

Patented Apr. 27, 1926.

1,582,345

UNITED STATES PATENT OFFICE.

WALTER A. O'BANNON, OF TULSA, OKLAHOMA.

SAFETY HOOK.

Application filed December 12, 1925. Serial No. 75,051. REISSUED

*To all whom it may concern:*

Be it known that I, WALTER A. O'BANNON, a citizen of the United States, residing at Tulsa, in the county of Tulsa and State of Oklahoma, have invented certain new and useful Improvements in Safety Hooks, of which the following is a specification.

The present invention relates to the art of appliances used in conjunction with well works, and is conventionally known as a safety hook.

The common form of such a device consists of an open hook generally of the swivel type but owing to the frequency with which these hooks become disengaged from the object which is being handled thereby, it is customary to provide them with guard latches which extend across the throat of the hook opening.

It is to this form of device that the present invention relates, its object being to provide such an appliance with manually operable means whereby the opening of the hook or latch will take place as an incident to the pressure of the operator's hand in the hook-off movement.

It is of prime importance in these devices that projecting parts be eliminated as far as possible to prevent the accidental unlocking of the hook incident to its engagement with the rigging, and therefore it has been my aim to dispose the operating means for the hook latch in a manner which will preclude catching any object with which it might come in contact.

It is further an important characteristic of my safety hook that in form or shape it is not unduly large at that portion which is grasped by the operator's hand, thereby greatly facilitating the operations of hooking and unhooking, this phase of the apparatus influencing the arrangement and structure of the parts forming the latch mechanism.

Other and further objects and advantages of the invention will be hereinafter set forth and the novel features thereof defined by the appended claims.

In the drawing:

Figure 1 is a side elevation of a safety hook constructed in accordance with my invention, partly broken away to show more clearly the details of construction and arrangement of the latch mechanism;

Figure 2 is a front elevation with the swivel and bearing omitted;

Figure 3 is a horizontal sectional view on the line 3—3 of Figure 1;

Figure 4 is a horizontal sectional view on the line 4—4 of Figure 1;

Figure 5 is a detail view of the lower end of a modified form of latch lever;

Figure 6 is a fragmentary view showing the interlocking slot in the latch with which the extremity of the latch lever coacts;

Figure 7 is a side elevation of a modified form of safety hook, the body of the hook being broken away to disclose the latch and operating lever mounted thereon;

Figure 8 is a front elevation of the hook device shown in Figure 7; and

Figure 9 is a detail view of the locking detent and operating lever therefor, taken from the side opposite that shown in Figure 7.

Like characters of reference designate corresponding parts throughout the several figures of the drawing.

Referring to the drawing, 1 designates the body portion of the hook which at its top is formed with the threaded stud 2 to receive the swivel bail 3 secured thereon by the nut 4. A roller bearing 5 is employed in conjunction with this swivel mounting.

The latch mechanism which forms the special feature of this invention is mounted in the shank portion of the hook above the opening of the same and for this purpose the material of the hook body is channeled out as indicated at 6 to receive the several parts. Within the lower enlarged portion of this channel formed in the offset 7 of the body is pivotally mounted the latch member or guard 8, which depends vertically from the pivot 9 across the entrance to the hook and in abutting relation to the wall 10 which prevents outward movement of the latch, thereby resisting any inclination of the load to jump out.

This latch is designed to be retired into its receiving recess or seat, the enlarged portion of the channel 6 above referred to, by the lever 11 which is pivotally connected at 12 adjacent the top of the hook, the lower end having an interlocking shiftable connection with the latch 8. The particular form of this connection may differ. In Figure 1 the latch lever 11 is provided with a lateral extension 12' which extends into a slot 8' in the latch member. The connection is a slidable one because of the swinging movement which it is necessary to impart to the latch member 8. The construction may be modified as shown in Figures 5 and 6 by forming an undercut groove 8″ in the rear face of the latch member and within this the opposing extensions 11″ of the latch lever are free to ride in the operation of the latch.

To maintain the latch normally in operative or closed position shown in full lines in Figure 1, a spring 13 is mounted in rear of the lever 11 which presses the latch against the wall 10.

It will be clear that in the operation of this hook, the operator needs only to move it into engagement with the object to be handled, the latch 8 yielding readily to pressure thereagainst and allowing the object to pass into the hook opening. When the unhooking operation is to be effected the operator's hand is about the neck or shank portion of the hook and in drawing the same toward him to cause the disengagement he exerts pressure against the front of the hook and the shank portion of the latch lever 11 which projects slightly from the surface of the hook body. This causes the latch member 8 to completely retire into its seat in the offset 7, leaving the hook opening completely free and unobstructed. It will be apparent that this unlatching movement is automatically produced, so to speak, in the natural unhooking of the safety device from the object which it carries.

Referring to Figures 7, 8 and 9 which show a modified form of my invention, the detent or latch 8ª is provided with the curved slot 8ᵇ of slightly greater width at the top 8ᵉ than the bottom, and provided on one wall with a raised portion in the form of a lug or cam 8ᵈ. The lateral extension 12′ of the release lever 11 is slidably interlocked in the slot 8ᵇ. The lever 11 is also provided with a shoulder 11ª adapted to engage the shoulder 8ᶜ of the detent 8ª and retain or lock the detent against inward movement.

The widened portion 8ᵉ of the slot is provided in order that the actuating lever 11 may be permitted to move inwardly sufficiently to disengage the shoulder 11ª on the lever 11 and the shoulder 8ᶜ on the detent and unlock said detent. This initial movement may be termed the unlocking movement and is shown in the intermediate dotted line position of Figure 9. Upon further inward movement of the lever 11, in the direction of the small arrow in Figure 9, the extension 12′ will engage the side of the slot 8ᵇ moving the detent 8ª inwardly from across the throat 1ª of the hook 1. This movement after the initial unlocking movement is the same as previously described in the descriptions of my preferred form. After the lever 11 has been pressed in, causing the detent to be withdrawn and the operator releases the said lever, the spring 13 moves the same outwardly, causing the detent 8ª to be moved across the opening 1ª of the hook. It is essential that the detent be moved to normal closed position before the lever 11 moves to final locking position.

To accomplish this function the cam or projection 8ᵈ on the wall of the slot 8ᵇ is so positioned that the lever 11 will move or cam the detent 8ª completely to closed position before the lateral extension 12′ can pass into the wider end 8ᵉ of the slot 8ᵇ and permit the shoulders 8ᶜ and 11ª to engage, locking the detent positively against accidental movement.

It will be comprehended readily by the construction as disclosed in this modification that while the operator may readily and easily open the hook with one hand, upon release of the latch lever 11 the detent 8 will not only be returned to normal position closing the mouth 1ª of the hook 1, but will positively lock the detent 8ª in this position, thereby preventing the hook from accidentally catching on any object, while at the same time obviating any possibility of accidentally disengaging the load.

In view of the use of a relatively long latch lever 11 a considerable degree of swinging movement is capable of being imparted to the latch member 8 by a very slight movement of said latch lever and hence it is necessary for this lever to project from the body of the hook very slightly. The strength of the hook is not materially weakened by the arrangement of this simple form of latch mechanism in the same, this being provided against in many of the safety hooks by materially enlarging the body of the hook to accommodate the latch mechanisms. Such enlargement of the hook body makes it difficult for the operator to grasp the hook comfortably and frequently this leads to accident because these bodies are relatively heavy under ordinary conditions.

It will be apparent that the latch mechanism which forms the subject matter of this invention is of a very simple character and may be cheaply manufactured, and I desire it to be understood that modifications in the form and arrangement thereof may be made without departing from the spirit of the invention and within the scope of the claims hereto appended. Such modification of the locking arrangement may consist of the omission of the shoulders 8ᶜ and 11ª, under which conditions the parts would still remain in a locking position by virtue of the cooperation of the projection 12′ with the cam 8ᵈ, as shown particularly in Figures 7 and 9.

Having thus described my invention, what I claim as new and desire to secure by Letters Patent is:

1. A safety device of the class described comprising a hook body, a latch member suspended across the entrance of the hook, and actuating means pivotally mounted at one end above the latch in the shank portion of the hook and operatively engaging the latch at its other end, said actuating means being operable in the direction of and as an incident to the application of pressure to the hook for hooking off movement of the same.

2. A safety device of the class described comprising a hook body, a latch member pivotally mounted above the opening of the hook so as to normally depend across said opening, and an actuating member pivotally mounted at a point remote from the pivotal connection of the latch member and having a connection with said latch member for swinging the same to and from the position aforesaid upon application of pressure at a point intermediate its pivot and said connection.

3. A safety device of the class described comprising a hook body, a latch member pivotally mounted above the opening of the hook so as to normally depend across said opening, means limiting the movement of the latch member in one direction, and a lever extending along the shank of the hook where grasped by the operator having shiftable connection with the latch at one end and pivotal connection with the hook at the other end, said lever being operable to swing the latch from said normal position into the hook body.

4. A safety device of the class described comprising a hook body having a channel extending longitudinally of the same and terminating in an enlarged recess, a latch member pivotally mounted on the hook body to extend across the opening of the hook, lever means having shiftable connection with the latch member at one end and pivotally mounted on the hook member in the channel aforesaid, said latch lever being operable to shift the latch member completely into the enlarged recess aforesaid.

5. A safety device of the class described comprising a hook body, a latch member pivotally mounted above the opening of the hook so as to normally extend across said opening, an actuating member mounted on the body and having connection with said latch member for swinging the same from the position aforesaid into inoperative position, and means on the body extending over the hook and constituting a guard for the hook and latch.

6. A safety device of the class described, comprising a hook body, a latch member extending across the entrance of the hook, and actuating means for operating the latch member, said actuating means constituting a locking means for the latch member.

7. A safety hook comprising a hook body, a detent adapted to close the entrance to the hook body, locking means for holding the detent across the hook opening, and actuating means for releasing the locking means and moving the detent out of the opening.

8. A safety hook comprising a hook body, a latch member pivotally mounted across the opening of the hook so as to normally close said opening, an actuating member pivoted at one end to the hook body and having interlocking engagement with the latch member for swinging the latch member, and locking means for the latch member operated incident to movement of the actuating member.

9. A safety device of the class described comprising a hook body, a latch member pivotally mounted above the opening of the hook so as to normally depend across said opening, means limiting the movement of the latch member in one direction, a lever extending along the shank of the hook where grasped by the operator having shiftable connection with the latch at one end and pivotal connection with the hook at the other end, said lever being operable to swing the latch from said normal position into the hook body, and interlocking means between the latch member and the lever for normally locking the latch member from movement, said means being moved into inoperative position incident to the movement of the lever.

10. A safety device of the class described comprising a hook body having a channel extending longitudinally of the same and terminating in an enlarged recess, a latch member pivotally mounted on the hook body to extend across the opening of the hook, lever means having shiftable connection with the latch member at one end and pivotally mounted on the hook member in the channel aforesaid, said latch lever being operable to shift the latch member completely into the enlarged recess aforesaid, and locking means for the latch member operable incident to initial latch shifting movement of the lever to unlock said latch member.

In testimony whereof I affix my signature.

WALTER A. O'BANNON.